United States Patent
Kelly et al.

(10) Patent No.: US 7,897,191 B2
(45) Date of Patent: Mar. 1, 2011

(54) SNACK CHIP CONTAINING BUCKWHEAT HULLS

(75) Inventors: Joseph William Kelly, Grapevine, TX (US); Terry Moros, Frisco, TX (US); Vamshidhar Puppala, McKinney, TX (US); Paula A. Wege, Plano, TX (US)

(73) Assignee: Frito-Lay North America, Inc., Plano, TX (US)

(*) Notice: Subject to any disclaimer, the term of this patent is extended or adjusted under 35 U.S.C. 154(b) by 888 days.

(21) Appl. No.: 11/609,214

(22) Filed: Dec. 11, 2006

(65) Prior Publication Data

US 2008/0138485 A1 Jun. 12, 2008

(51) Int. Cl.
*A21D 13/00* (2006.01)
*A21D 2/36* (2006.01)

(52) U.S. Cl. .................. 426/560; 426/549; 426/439; 426/473

(58) Field of Classification Search .................. None
See application file for complete search history.

(56) References Cited

U.S. PATENT DOCUMENTS

| | | | |
|---|---|---|---|
| 3,155,521 A * | 11/1964 | Ward et al. .................. 514/311 |
| 4,237,170 A * | 12/1980 | Satin .................. 426/21 |
| 4,409,250 A * | 10/1983 | Van Hulle et al. .......... 426/242 |
| 4,645,679 A | 2/1987 | Lee et al. |
| 4,800,088 A | 1/1989 | Sawhill |
| 4,873,093 A | 10/1989 | Fazzolare et al. |
| 5,185,174 A | 2/1993 | Sawhill |
| 5,464,643 A | 11/1995 | Lodge |
| 5,643,622 A | 7/1997 | Sawhill |
| 5,652,010 A * | 7/1997 | Gimmler et al. .......... 426/549 |
| 5,789,012 A | 8/1998 | Slimak |
| 5,871,801 A | 2/1999 | Kazemzadeh |
| 6,001,409 A | 12/1999 | Gimmler et al. |
| 6,488,957 B1 | 12/2002 | Koumarianos |
| 6,491,959 B1 * | 12/2002 | Chiang et al. .............. 426/560 |
| 6,558,691 B1 | 5/2003 | Koumarianos |
| 6,726,941 B2 | 4/2004 | Ethington, Jr. et al. |
| 6,830,767 B2 | 12/2004 | Teras et al. |
| 2002/0034571 A1 * | 3/2002 | Zimmerman et al. ........ 426/549 |
| 2005/0079269 A1 * | 4/2005 | Baker et al. ................ 426/622 |

(Continued)

FOREIGN PATENT DOCUMENTS

JP 2002-245350 A 9/2000

OTHER PUBLICATIONS

Oplinger et al., Buckwheat, Oct. 18, 2001, Field Crops Manual, pp. 1-12.*

(Continued)

*Primary Examiner*—Timothy M Speer
*Assistant Examiner*—Felicia C King
(74) *Attorney, Agent, or Firm*—Bobby W. Braxton; Colin P. Cahoon; Carstens & Cahoon, LLP

(57) ABSTRACT

A multi-grain chip having buckwheat hull inclusion of a specific particle size. The buckwheat hull component of the chip provides a visual indication of the multi-grain characteristics of the chip. The particle size of the buckwheat hulls is specified in order to compliment production of the chip on existing corn chip lines and to enhance product visual attributes.

23 Claims, 1 Drawing Sheet

U.S. PATENT DOCUMENTS

2005/0136174 A1* 6/2005 Korolchuk et al. .......... 426/622

OTHER PUBLICATIONS

"Dietfacts" Apr. 23, 2006 http://www.dietfacts.com/html/nutrition-facts/frito-lay-tostitos-multigrain-tortilla-chips-four-wholesome-grains-41301.htm.*

"Dietfacts" Apr. 23, 2006 http://www.dietfacts.com/html/nutrition-facts/frito-lay-tostitos-multigrain-tortilla-chips-four-wholesome-grains-41301.htm. (Previously Presented in Reference Cited -892 dated Dec. 8, 2009, but resubmitted for clearer image).*

XP-002588867, "Multigrain Tortilla Chips" retrieved from Internet on Mar. 10, 2010 at http://www.gnpd.com/sinatra/gnpd/search_result/&item_id=549442, 1 page.

XP-002588868, Lusas, Edmund W., "Snack Foods Processing," pub. Jun. 5, 2001, pp. 462-463.

XP-002588870, "Product Specifications, First Prize Buckwheat Flour" retrieved from Internet on Jun. 24, 2010 at http://thebirkettmills.com/specs/dark-buckwheat-flour.pdf, 7 pages.

XP-002588898, Krkoskova, B., "Prophylactic components of buckwheat," Food Search International, vol. 38, Nov. 25, 2004, pp. 561-568.

XP-002588899, Steadman, K.J., "Buckwheat Seed Milling Fractions: Description, Macronutrient Composition and Dietary Fibre," Journal of Cereal Science, vol. 33, May 10, 2000, pp. 271-278.

XP-002588900, Ikeda, K., "Analysis of Texture of Doughs from Buckwheat Flours," Fagopyrum, vol. 12, Jan. 1, 1992, pp. 17-20.

* cited by examiner

SNACK CHIP CONTAINING BUCKWHEAT HULLS

BACKGROUND OF THE INVENTION

1. Technical Field

The present invention relates to a method for making an improved sheeted snack food and, more particularly, to a method for making a multi-grain sheeted snack food having visual inclusions comprising buckwheat hulls.

2. Description of Related Art

Sheeted snack foods, such as fabricated potato chips and corn chips, are popular consumer items for which there exists a great demand. When making a sheeted snack food, first a starch-based dough is sheeted, it is next cut into pieces of a desired shape, and then cooked. Often the desired snack piece shape is that of a square, triangle, or circle. After the dough is cut into pieces, the pieces are cooked (by for example frying, baking, or both) which reduces their moisture content. The snack pieces are seasoned and then sent to be packaged.

A sheeter is a device commonly used in the food industry for making such flattened or sheeted food products (tortilla chips and fabricated potato chips, for example) in a continuous processing operation. Typically, a dough product is compressed between a pair of counter rotating sheeter rollers that are located closely together, thereby providing a pinch point through which the dough is formed into sheets. The dough can then be cut by, for example, a cutting roller to form the shape of the product desired.

Many dough products, particularly those that are corn based ("masa"), have a tendency to stick to the sheeter rollers rather than dropping onto a conveyer for transportation to the next processing step, such as a baking oven. One common approach to this problem is to string a stripper wire across the face of the sheeter roller so that the stripper wire can scrap away the dough product off of the surface of the roller. Solutions such as this are discussed in detail in U.S. Pat. No. 6,268,005 which issued on Jul. 31, 2001, and is entitled "Sheeter Wire Apparatus." A scraper blade can also be used to remove dough from the surface of the rollers.

In recent years, consumer demand has been dramatically increasing for healthy foods in general, and healthy snack foods in particular. Nutritious snacks should ideally meet several criteria that include limits on the amount of fat, including saturated and trans-fatty acids, cholesterol, sodium, and added sugar.

The popularity of whole grain snacks has been increasing, partly as the result of the USDA recommendation that one-half of all grains that are eaten be whole grains. Whole grains are defined as containing the entire grain kernel (bran, germ, and endosperm) and can include corn, brown rice, bulgur, oatmeal, barley, rye, and buckwheat. A typical indicator to the consumer that a product contains whole grains is visible particles of bran in the product. It would be beneficial if whole grains could be included in snack products, with the whole grain being visible to the consumer, thus giving the consumer a visual confirmation that the product contains beneficial whole grains.

It is difficult, however, to make whole grain snacks using conventional dough sheeting, because the bran or pericarp will accumulate on the sheeter wire or scraper blade, resulting in inconsistent removal of the dough from the rollers. Also, large pieces of bran or pericarp can be reduced in size by the physical forces encountered during the sheeting process. This reduction in size reduces the final visibility of the bran pieces.

Buckwheat has gained an excellent reputation for its nutritious qualities in the human diet. Most of the buckwheat utilized for humans is marketed in the form of flour for which the primary end use is pancake mixes. Some of the buckwheat flour used in prior art buckwheat food products is whole grain and contains hulls, but these hull particles are not easily discernable as individual particles of the buckwheat hull. This is because approximately 99% of buckwheat flour (including hulls) will pass through a #60 U.S. standard sieve. Yet, consumer studies show that consumers are more likely to identify a product as having a whole grain content if the whole grain ingredients are visually apparent.

It would be beneficial to have a whole grain buckwheat-containing sheeted snack where buckwheat hull particles are visible in the final product such that consumers can tell that whole grain buckwheat is present, but that does not result in excessive accumulation of the dough on the sheeting wire or scraper blade.

Consequently, the need exists for a nutritious snack chip having a high content of whole grains with an appearance that indicates that the whole grains are present and that is made from a dough that is readily sheetable on existing snack food sheeters. Such product should ideally have whole grain components that are easily identified as such by the consumer.

SUMMARY OF THE INVENTION

The present invention is a method of producing a sheeted snack chip containing visible buckwheat hulls, without creating excessive build-up on the sheeter wire or scraper. Such sheeted snacks are those made by preparing a moist dough comprised of farinaceous materials, including but not limited to; corn, potato, rice, oats, tapioca, wheat, lime-treated corn, buckwheat flour, bean flour, barley flour, wheat germ, rye flour, sorghum flour, graham flour, and mixtures thereof. These doughs may also include added starches, gelatinized or ungelatinized, as well as leavening ingredients and other fats or emulsifiers. The moisture level of these doughs may range from 25% to 70% of the total dough.

To this dough is then added ground buckwheat hulls having a specific particle size. These buckwheat hulls can be from any buckwheat variety, but it is beneficial that they be brown or black in color, so as to increase their visibility. The most preferred varieties are Koto or Komo, because they are uniform black in color. The buckwheat hulls should have a particles size such that 99% or more by weight pass through a 20-mesh U.S. standard screen, and more than 80% by weight do not pass through a 60-mesh U.S. standard screen. Consequently, prior art unmilled buckwheat hulls are not acceptable as the buckwheat hulls component of Applicants' invention.

Particles that do not pass through a 20-mesh U.S. standard screen accumulate on the sheeter wire/scraper and are large enough to cause holes in the dough sheet, and are thus undesirable. Residue levels above 1% on the 20-mesh U.S. standard screen result in excessive wire accumulation, holes in the dough sheet, and frequent production halts to clean the wire. Particles that pass through a 60-mesh U.S. standard screen, however, are not discretely visible in the final product. Levels above 20% through the 60-mesh, as well as not being discretely visible, result in an overall darkening of the product giving it a burnt appearance which is not favored by consumers.

The ground buckwheat hulls are added to the dough at a level of 0.05% to 5% by weight of the dough. Addition levels below 0.05% result in insufficient hull visibility in the final product. Addition levels above 5% result in too many visible particle hulls, such that the product appears darker than consumers prefer.

The dough is then reduced in thickness and formed into a sheet using rollers. The thickness of this sheet can range between 0.015 inches to 0.10 inches. The ground buckwheat hull particles are of a strong enough consistency, and of the appropriate particle size, such that minimal reduction in particle size is encountered during the sheeting process, and holes are not created in the dough sheet.

The dough is then cut into pieces while on the rollers, or cut after removal from the rollers. The dough sheet is removed from the surface of the rollers utilizing one or more sheeter wires and/or scraping blades.

The sheeted dough pieces are toasted, although this is not essential, and then fried or baked to reduce the moisture content of the final product below 4%. The final product has numerous visible buckwheat hull particles, without an unsatisfactory darkening of the overall product. Further, making such product does not require frequent production stoppages to clean the sheeter wire or scraper blade.

Consequentially, the method provides a means of producing a whole buckwheat-containing sheeted snack, where buckwheat hull particles are visible in the final product, such that consumers can tell that whole grain buckwheat is present, but does not result in excessive accumulation on the sheeting wire or scraper blade, so that ease of manufacturing is maintained.

These as well as additional features and advantages of the present invention will become apparent in the following written description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION OF THE PREFERRED EMBODIMENTS

Figure 1:
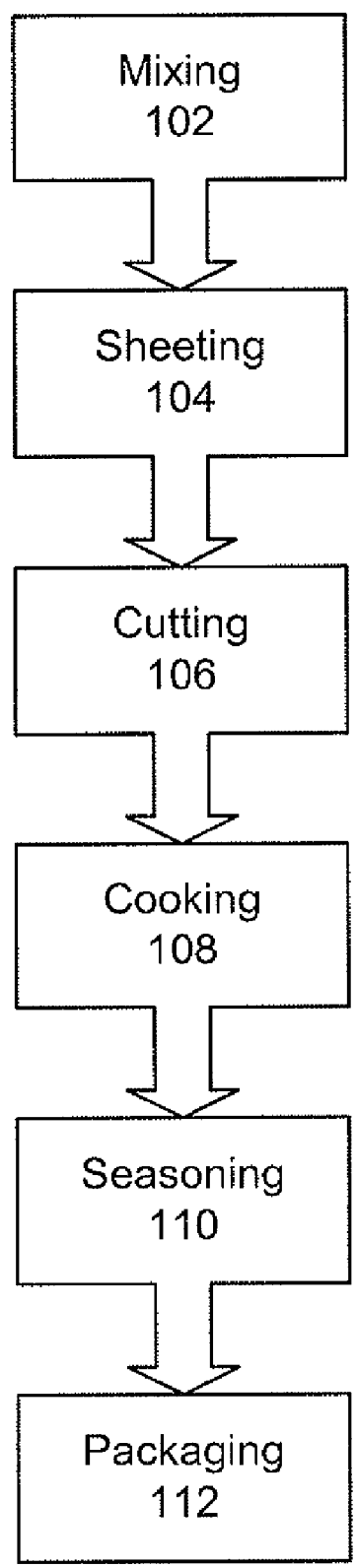
FIG. 1 is a flowchart indicating the processing steps for the present invention.

FIG. 1 illustrates one embodiment of the method for making the snack chip of Applicants' invention. The first step involves mixing 102 the starting ingredients. This mixing step is characterized as a low-sheer mixing in order to avoid damaging the cellular structure of the starting ingredients and is intended to fully blend the starting ingredients. Further, this low-sheer mixing does not add a substantial amount of work to the dough that is produced. This mixing step 102 can comprise one or more individual mixing operations. For example, a first dry-mixing operation can occur where all dry ingredients are thoroughly blended and then combined with water to form a sheetable dough. Alternatively, dry ingredients can be mixed in a separate pre-blend step and then added to a wet ingredient mixture, such as corn meal, for a final mix to produce the desired dough. This dry pre-blend approach is most suitable for adaptation to food lines that produce corn-based chip products. The dough produced by this mixing step 102 is typically characterized as being starch-based and has a typical moisture level of between 36% to 60% by weight, preferably between 44% to 52%, or most preferably between about 47% and about 49%.

The dough produced by the mixing step 102 is then subjected to a sheeting step 104. This sheeting step 104 can comprise a single pair of sheeting rollers or a series of rollers, each of which successively decreases the thickness of the resulting sheet. The advantage of using rollers in series is that less work is imparted on the dough during sheeting. The dough sheet produced by the sheeting step 104 is preferably in the range of 0.01 inches to 0.20 inches thick, and more preferably in the range of between 0.015 inches to 0.10 inches thick. The dough leaves the sheeting rollers during the sheeting step 104 as a cohesive and continuous sheet of uncooked dough.

This sheet of dough is next cut in a cutting step 106, typically with cutting rollers. This cutting step 106 creates individual dough pieces that are then conveyed to a cooking step 108. The shape of the chip can be any of a number of shapes known in the art, such as triangular, circular, square, etc.

The cooking step 108 can involve baking the pieces, frying the pieces, or other methods known in the food industry for cooking and drying snack chips, such as using microwave energy, infrared energy, impingement ovens, surface or bed frying, and various sequential combinations thereof For example, the dough piece can be baked to a certain moisture level and then finish fried, or par fried and then finish dried in an oven.

After the cooking step 108, the cooked snack pieces, which now have a moisture level of below 4% by weight, and most preferably between about 1% and about 3% by weight, are then subjected to a seasoning step 110 by methods known in the art, such as using seasoning curtains, seasoning sprays, or a seasoning drum.

After seasoning, the chips are transported for packaging. Typical packaging involves using a vertical form, fill, and seal machine in order to deposit the snack pieces into a flexible package for retail sale.

One aspect of Applicants' invention is the addition of buckwheat hulls to the dough formed by the mixing step 102. In order to provide the visual characteristics that consumers find desirable while adapting Applicants' invention to existing corn chip product lines, a preferred embodiment of Applicants' invention requires that the buckwheat hulls added are ground to a specific particle size. Specifically, at least 99% of such ground buckwheat hulls by weight should pass through a 20-mesh U.S. standard screen and, further, more than 80% by weight of said ground buckwheat hulls should not pass through a 60-mesh U.S. standard screen. Stated another way, less than 20% by weight of said ground buckwheat hulls should pass through a 60-mesh U.S. standard screen. In a more preferred embodiment, Applicants further require that at least 10% by weight of the ground buckwheat hulls do not pass through a 30-mesh U.S. standard screen (or that less than 90% pass through). Finally, in a most preferred embodiment, Applicants additionally require that at least 25% by weight of the ground buckwheat hulls do not pass through a 40-mesh U.S. standard screen (or that less than 75% pass through). The ground buckwheat hulls of this particle size are added to the dough such as to provide that the buckwheat hull component of the final product is between 0.1% and 10% of the final product weight. In a preferred embodiment, this ground buckwheat hull component is between 0.1% and 3% of the final product weight. In a most preferred embodiment, the ground buckwheat hulls comprise about 0.3% to about 1.0% by weight of the snack chip. A preferable concentration of the ground buckwheat hull component in the dough is between about 0.05% and about 2% by weight. It is preferable that the ground buckwheat hulls that are added are generally dark in color. Applicants have determined that the Koto or Koma variety of buckwheat hulls are an acceptable ingredient in this regard. It should be understood that this ground buckwheat hulls component of this specific particle size must be prepared in advance of the mixing step 102 to meet the specifications for particle size detailed above. This preparation step involves producing a ground buckwheat hull component meeting the particle size characteristics detailed above.

The primary components of the dough produced by the mixing step 102 comprises farinaceous materials selected from a group consisting of corn, potato, rice, oats, tapioca, wheat, lime-treated corn, buckwheat flour, bean flour, barley flour, wheat germ, rye flour, sorghum flour, graham flour, amaranth and teff. The dough can also have added starches, such as corn starch or potato starch, and, in an alternative embodiment, can include leavening ingredients.

Table 1 below provides an example of a corn chip embodiment of Applicants' invention.

TABLE 1

CORN CHIP DOUGH FORMULATION

| Ingredient | Percent by Weight |
|---|---|
| Water | 48.00% |
| Corn | 39.0% |
| Corn Starch | 5.0% |
| Sugar | 2.0% |
| Whole Oat Flour | 2.0% |
| Toasted Corn Germ | 1.0% |
| Whole Wheat Flour | 1.0% |
| Buckwheat Flour | 1.6% |
| Buckwheat Hulls | 0.4% |

The corn source for this formulation is typically cooked, milled corn, but dried corn flour can also be used. The sugar component can be sucrose, fructose, dextrose, corn syrup, high fructose corn syrup, honey, brown sugar, or any number of artificial sweeteners.

The buckwheat flour consists of a combination of whole buckwheat flour and light buckwheat flour. The whole buckwheat flour component is a buckwheat flour made by milling the whole buckwheat including the hulls. Consequently, greater than 99% of such buckwheat flour passes through a 60-mesh U.S. standard screen and is slightly grey in appearance and imparts a grayish color in the final product. However, it should be understood that when Applicants use the term "ground buckwheat hulls," Applicants are referring to a discrete separate ingredient of substantially only buckwheat hulls and not to any hull component of prior art whole buckwheat flour. The light buckwheat flour component is a buckwheat flour made by milling buckwheat without the hulls, thereby producing a flour having a white appearance. The buckwheat hulls component in the embodiment illustrated in Table 1 meets all of the particle size requirements listed above for the buckwheat hulls component of the most preferred embodiment of the dough.

Because Applicants add as a separate component ground buckwheat hulls, the hull level of the combined buckwheat components (ground buckwheat hulls, whole buckwheat flour, and light buckwheat flour) is higher than if Applicants only used whole buckwheat flour as the source of buckwheat ingredients. In other words, the hull component of the buckwheat ingredients used in Applicants' preferred embodiment is higher then the hull component of prior art whole buckwheat flour, specifically greater than 30% by weight versus about 25% by weight, respectively, in a preferred embodiment. Despite the higher level of hull component, Applicants' preferred embodiment is lighter in overall color than prior art whole buckwheat but with more visible hull particles. Thus, Applicants can use as levers the relative ratios of the ground buckwheat hull component, the whole buckwheat flour component, and the light buckwheat flour component of the overall ingredients in order to manipulate the color, texture, and surface appearance of the end product, in a manner not possible with just whole buckwheat and light buckwheat flour components.

The dough of Table 1 is formed by mixing dry ingredients, any wet ingredients, and added water during a mixing step 102. The dough then is sheeted during the sheeting step 104 to a preferred thickness of about 0.030 inches to about 0.10 inches and then cut 106 to individual dough pieces. This sheeting thickness can be accomplished in light of the particle size requirements previously discussed. During the cooking step 108, the cut dough pieces in a preferred embodiment pass through a toast oven using infrared heaters and heated belting to reduce the total moisture of the dough pieces from about 48% to about 24% by weight. The pieces are then fried in corn oil to a moisture level of about 1.1% by weight. Alternatively, the dough pieces could be fried first and then finish dried. Also, the dough pieces could be simply fried or baked.

Table 2 below lists the components of the final product produced from the dough disclosed in Table 1 in accordance with the processing steps described above.

TABLE 2

EXAMPLE CORN CHIP FINAL PRODUCT FORMULATION

| Ingredient | Percent by Weight |
|---|---|
| Corn | 57.4% |
| Corn Oil | 23% |
| Corn Starch | 7% |
| Sugar | 3% |
| Whole Oat Flour | 3% |
| Toasted Corn Germ | 1.5% |
| Whole Wheat Flour | 1.5% |
| Whole Buckwheat Flour | 1% |
| Light Buckwheat Flour | 1% |
| Salt | 1% |
| Buckwheat Hulls | 0.6% |

Table 2 lists the components of the final product on a dry basis. This particular product receives high ratings from consumers for its taste, mouth feel, and multi-grain appearance. Yet, the starting material used for the dough (as disclosed in Table 1) is sheetable using current corn chip sheeting lines, such as those used to make traditional tortilla chips. As a result, there is not excessive accumulation on the sheeting wire or scraper blades during the sheeting step 104 using existing plant equipment.

While Applicants' invention has been described in respect to specific formula and processing steps, it should be understood that Applicants' invention encompasses broadly the use of a buckwheat hull component added to a food product to produce the desired visual effect within the operating parameters of the equipment used to make the product in question.

We claim:

1. A snack chip made from a dough, said snack chip comprising:
    about 0.1% to about 3.0% by weight ground buckwheat hulls, wherein said ground buckwheat hulls are an ingredient added to the dough in an average particle size that is characterized by less than 20% by weight of the ground buckwheat hulls passing through a 60-mesh U.S. standard screen.

2. The snack chip of claim 1 wherein further the average particle size of the buckwheat hulls added as an ingredient to the dough is characterized by at least 99% of said hulls passing through a 20-mesh U.S. standard screen.

3. The snack chip of claim 1 wherein further the average particle size of the buckwheat hulls added as an ingredient to the dough is characterized by less than 90% of said hulls passing through a 30-mesh U.S. standard screen.

4. The snack chip of claim 1 wherein further the average particle size of the buckwheat hulls added as an ingredient to the dough is characterized by less than 75% of said hulls passing through a 40-mesh U.S. standard screen.

5. The snack chip of claim 1 wherein the ground buckwheat hulls comprise about 0.3% to about 1.0% by weight of the snack chip.

6. The snack chip of claim 1 wherein the chip further comprises farinaceous material selected from the group consisting of corn, potato, rice, oats, tapioca, wheat, lime-treated corn, buckwheat flour, bean flour, barley flour, wheat germ, rye flour, sorghum flour, graham flour, amaranth, teff, and combinations thereof.

7. The snack chip of claim 6 wherein further the farinaceous material comprises corn.

8. The snack chip of claim 1 wherein said snack chip comprises on a dry weight percentage about 57% corn, about 23% corn oil, about 7% corn starch, about 3% sugar, about 3% whole oat flour, about 1.5% toasted corn germ, about 1.5% whole wheat flour, about 1% whole buckwheat flour, about 1% light buckwheat flour, and about 0.6% buckwheat hulls.

9. A snack chip dough comprising:
about 0.05% to about 2.0% by weight ground buckwheat hulls, wherein said ground buckwheat hulls comprise an average particle size that is characterized by less than 20% by weight of the ground buckwheat hulls passing through a 60-mesh U.S. standard screen.

10. The snack dough of claim 9 wherein further the average particle size of the buckwheat hulls is characterized by at least 99% of said hulls passing through a 20-mesh U.S. standard screen.

11. The snack chip dough of claim 9 wherein further the average particle size of the buckwheat hulls is characterized by less than 90% of said hulls passing through a 30-mesh U.S. standard screen.

12. The snack chip dough of claim 9 wherein further the average particle size of the buckwheat hulls is characterized by less than 75% of said hulls passing through a 40-mesh U.S. standard screen.

13. The snack chip dough of claim 9 wherein the ground buckwheat hulls comprise about 0.4% by weight of the dough.

14. The snack chip dough of claim 9 wherein the dough further comprises farinaceous material selected from the group consisting of corn, potato, rice, oats, tapioca, wheat, lime-treated corn, buckwheat flour, bean flour, barley flour, wheat germ, rye flour, sorghum flour, graham flour, amaranth, teff, and combinations thereof.

15. The snack chip dough of claim 14 wherein further the farinaceous material comprises corn.

16. The snack chip dough of claim 9 wherein said dough comprises on a weight percentage about 48% water, about 39% corn, about 5% corn starch, about 2% sugar, about 2% whole oat flour, about 1% toasted corn germ, about 1% whole wheat flour, about 1.6% buckwheat flour, and about 0.4% buckwheat hulls.

17. A snack chip made from the dough of claim 9.

18. A method for making a snack chip, said method comprising the steps of:
a) preparing a ground buckwheat hulls component having an average particle size that is characterized by less than 20% by weight of the ground buckwheat hulls passing through a 60-mesh U.S. standard screen;
b) mixing said ground buckwheat hulls component with other ingredients to form a dough;
c) sheeting said dough to a thickness of between 0.015 inches to 0.25 inches;
d) cutting said sheeted dough into individual dough pieces; and
e) cooking said dough pieces to a final moisture level of between 1% and 3% by weight.

19. The method of claim 18 wherein the ground buckwheat hulls component of step a) is further characterized by at least 99% of said hulls passing through a 20-mesh U.S. standard screen.

20. The method of claim 18 wherein the ground buckwheat hulls component of step a) is further characterized by less than 90% of said hulls passing through a 30-mesh U.S. standard screen.

21. The method of claim 18 wherein the ground buckwheat hulls component of step a) is further characterized by less than 75% of said hulls passing through a 40-mesh U.S. standard screen.

22. The method of claim 18 wherein the dough is sheeted during step c) to a thickness of from about 0.03 inches to about 0.1 inches.

23. The method of claim 18 wherein the cooking step e) further comprises toasting said cut dough piece to a moisture level of about 24% by weight followed by frying said piece to a moisture level of about 1.1% by weight.

* * * * *